United States Patent
Stuntebeck

(10) Patent No.: US 10,574,660 B2
(45) Date of Patent: Feb. 25, 2020

(54) CONTINUOUS SENSITIVE CONTENT AUTHENTICATION

(71) Applicant: AirWatch LLC, Atlanta, GA (US)

(72) Inventor: Erich Stuntebeck, Johns Creek, GA (US)

(73) Assignee: AirWatch, LLC, Atlanta, GA (US)

(*) Notice: Subject to any disclaimer, the term of this patent is extended or adjusted under 35 U.S.C. 154(b) by 327 days.

(21) Appl. No.: 15/190,619

(22) Filed: Jun. 23, 2016

(65) Prior Publication Data
US 2017/0374074 A1 Dec. 28, 2017

(51) Int. Cl.
 *H04L 29/06* (2006.01)
 *G06F 21/31* (2013.01)

(52) U.S. Cl.
 CPC ........... *H04L 63/102* (2013.01); *G06F 21/31* (2013.01); *H04L 63/08* (2013.01); *H04L 63/0861* (2013.01)

(58) Field of Classification Search
CPC ... H04L 63/102; H04L 63/08; H04L 63/0861; G06F 21/31; G06F 2221/2139
See application file for complete search history.

(56) References Cited

U.S. PATENT DOCUMENTS

| | | | | |
|---|---|---|---|---|
| 8,656,472 B2* | 2/2014 | McMurtry | ............ | G06F 21/335 713/185 |
| 8,812,860 B1* | 8/2014 | Bray | ...................... | G06F 21/34 713/182 |
| 10,091,177 B1* | 10/2018 | Trachtman | .............. | H04L 67/12 |
| 2004/0128508 A1* | 7/2004 | Wheeler | .................. | G06F 21/33 713/170 |
| 2007/0198436 A1* | 8/2007 | Weiss | ...................... | G06F 21/32 705/75 |
| 2009/0168756 A1* | 7/2009 | Kurapati | ................. | H04L 63/08 370/352 |
| 2011/0314558 A1* | 12/2011 | Song | ..................... | G06F 21/316 726/28 |
| 2012/0323717 A1* | 12/2012 | Kirsch | ............... | G06Q 20/0855 705/26.1 |
| 2013/0074149 A1* | 3/2013 | Shaikh | .................. | H04L 63/108 726/3 |
| 2014/0215066 A1* | 7/2014 | Kamat | .................. | H04L 67/146 709/225 |

* cited by examiner

*Primary Examiner* — Khalil Naghdali
(74) *Attorney, Agent, or Firm* — Thomas Horstemeyer, LLP

(57) ABSTRACT

Continuous sensitive content authentication is described. In one example, a request to open content, such as a photograph, spreadsheet, or text-based document, among other types of content, is received. Based on a sensitivity level or access profile rule associated with the content, an individual can be prompted to perform an authentication procedure before the content is displayed. The content can be displayed in response to a verification using the authentication procedure or removed (or not displayed) in response to a rejection using the authentication procedure. Additionally, the authentication procedure can be continuously polled to confirm the verification while the content is displayed. While the content is being displayed, the content can be removed from display at any time if the authentication procedure no longer produces the verification result. In some cases, the content can also be deleted after a rejection is detected using the authentication procedure.

20 Claims, 3 Drawing Sheets

CONTINUOUS SENSITIVE CONTENT AUTHENTICATION

BACKGROUND

Device access control is often relied upon to prevent unauthorized access to computing devices and systems. Different types of device access control can rely upon passwords, software or hardware keys, biometric keys, multi-factor authentication, etc. Different types of device access control can be more or less susceptible to attack and circumvention, comparatively. Thus, for securing especially sensitive systems, weaker or less stringent types of access control can be unsuitable. Meanwhile, from a usability standpoint, certain types of access control can be more or less difficult and/or frustrating for a user to use. Generally, it is preferred to select an appropriate type of access control based upon a balance of the type of computing system or device being protected, the expectations of the user, and the consequences of access control circumvention, among other factors.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
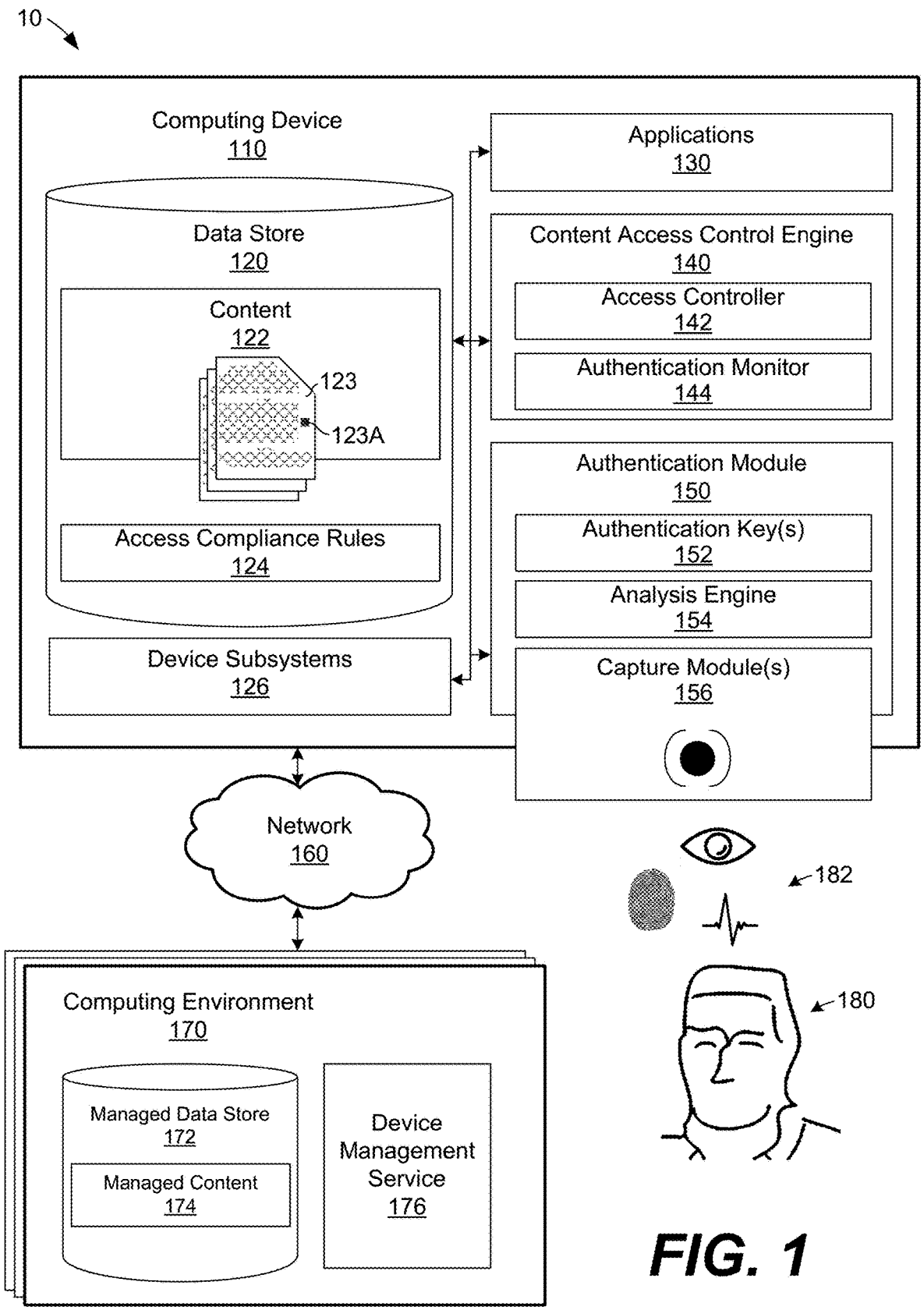
FIG. 1 illustrates an example networked environment for continuous sensitive content authentication according to various examples described herein.

As described above, device access control is often relied upon to prevent unauthorized access to sensitive computing devices and systems. Access control techniques can rely upon passwords, software or hardware keys, biometric keys, multi-factor authentication, or other ways to confirm the identity of individuals. Different types of device access control can be more or less susceptible to attack and circumvention, comparatively. Thus, for securing especially sensitive systems, weaker or less stringent types of access control might be unsuitable. Beyond controlling access to devices, access control can be used to prevent unauthorized access to various types of sensitive content, such as photographs, spreadsheets, or documents, among other types of content.

Access control can be circumvented in certain ways, however. For example, an individual can enter a password to gain access to a computing system and then inadvertently fail to lock the system when finished. In that case, another unauthorized individual can use the system once it has been unlocked for access. In other cases, an authorized individual can intentionally open a sensitive document and then provide a display of that document to an unauthorized individual, completely bypassing access control measures. Often, access control techniques do not require any type of re-verification of access credentials at any intervals in time. If an access control technique does not require any type of re-verification, a technical problem may arise in that the access control technique might not be capable of detecting whether an unauthorized user is currently viewing sensitive content despite whether the sensitive content was opened by an authorized user.

In the context outlined above, aspects of continuous content authentication are described. In one example, a request to open content, such as a photograph, spreadsheet, or text-based document, among other types of content, is received. Based on a sensitivity level (e.g., confidentiality, privacy, etc., level) or access profile rule associated with the content, an individual can be prompted to perform an authentication procedure before the content is displayed. The content can be displayed in response to a verification using the authentication procedure or removed (or not displayed) in response to a rejection using the authentication procedure. Additionally, the authentication procedure can be continuously polled to confirm the verification while the content is displayed. While the content is being displayed, the content can be removed from display at any time if the authentication procedure no longer produces the verification result. In some cases, the content can also be deleted after a rejection is detected using the authentication procedure.

The continuous authentication concepts described herein can be applied as a technical solution to the technical problems inherent in single-time authentication procedures. Particularly, the continuous authentication concepts can determine whether (and when) unauthorized users might have gained control of a computing device after sensitive content was opened on it. The continuous authentication concepts can protect any type of content files on any type of computing device or system. The concepts can even be applied to the transfer of content over computer networks. For example, sensitive content can be stored on a remote computing environment and access to it can be requested by a local computing device. In that case, the computing environment might require a certification that an individual permitted to access the sensitive content was verified using an authentication procedure at the local computing device before the computing environment will transmit a copy of the sensitive content to the local computing device for viewing, editing, etc. The computing environment might also perform remote management of certain operations on the local computing device. Thus, if ongoing certified indicators of the verification result are not received periodically or within a certain intervals of time, the computing environment can direct the local computing device to delete or remove the copy of the sensitive content.

In the following paragraphs, a general description of a representative system and its components is provided, followed by a discussion of the operation of the same. FIG. 1 illustrates an example networked environment 10 for continuous sensitive content authentication according to various examples described herein. The networked environment 10 includes a computing device 110, a network 160, and a computing environment 170.

The computing device 110 is representative of any type of computing device, including but not limited to a desktop computer, a laptop computer, a tablet computing device, a cellular telephone, a personal digital assistant, a wearable computing device, a handheld gaming device, a music or media player, etc. Thus, the computing device 110 can include one or more processors, processing circuits, memories, physical layer subsystem devices, etc. The computing device 110 can also be embodied, in part, as certain functional or logical (e.g., computer-readable instruction) elements or modules. Those elements can be executed to direct the computing device 110 to perform aspects of continuous authentication as described herein. As illustrated in FIG. 1, the computing device 110 includes a data store 120, device subsystems 126, applications 130, a content access control engine 140, and an authentication module 150, the operations of each of which are described in further detail below.

The network 160 can include the Internet, intranets, extranets, wide area networks (WANs), local area networks (LANs), wired networks, wireless networks, cable networks, satellite networks, other suitable networks, or any combinations thereof. The computing device 110 can communicate with the computing environment 170 among other network elements using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. Although not shown in FIG. 1, the network 160 can include connections to other network hosts, such as website servers, file servers, cloud computing resources, and other network computing architectures.

The computing environment 170 can be embodied as a computer, computing device, or computing system. In certain embodiments, the computing environment 170 can include one or more computing devices arranged, for example, in one or more server or computer banks. The computing device or devices can be located at a single installation site or distributed among different geographical locations. The computing environment 170 can include a plurality of computing devices that together embody a hosted computing resource, a grid computing resource, and/or other distributed computing arrangement. In some cases, the computing environment 170 can be embodied as an elastic computing resource where an allotted capacity of processing, network, storage, or other computing-related resources varies over time. As further described below, the computing environment 170 can also be embodied, in part, as certain functional or logical (e.g., computer-readable instruction) elements or modules. Those elements can be executed to direct the computing environment 170 to perform aspects of continuous authentication as described herein.

The computing environment 170 can host content for access by the computing device 110 over the network 160. The computing environment 170 can also be relied upon as a management service or device manager of the computing device 110, among other devices similar to the computing device 110. In that context, the computing environment 170 includes a managed data store 172 and a device management service 176. The managed data store 172 includes managed content 174 for conditional, authenticated access by one or more users of the computing device 110, and the device management service 176 is configured to control or manage the conditional access to the managed content 174 as described herein. Additional aspects of the operation of the computing environment 170 are described in further detail below.

Turning back to computing device 110, the data store 120 includes memory areas for storage of content 122 and access compliance rules 124. The content 122 includes various types of data files 123, such as documents, photographs, presentation files, and video and audio files, among other types of content files. The data files 123 can be opened, displayed, and edited by the computing device 110 using the applications 130. According to the concepts of continuous authentication described herein, some of the data files 123 contain sensitive content designated for access by only certain users or certain groups of users and only under certain conditions. One or more of the data files 123 can be associated with metadata 123A that defines access permission requirements and compliance rules for access to the data files 123. The metadata 123A can be incorporated within the data files 123, stored as part of the access compliance rules 124, stored elsewhere in the data store 120, stored at another suitable location in memory, or stored in any combination of those locations.

According to the concepts of continuous authentication described herein, depending upon the access permission requirements for a given data file 123, the data file 123 can be opened by the computing device 110 only upon continuous verification of the identity or credentials of the user 180 of the computing device 110. Additionally, access to (e.g. display of the contents of) that data file 123 is permitted to continue only so long as the identity or credentials of the user 180 are continuously verified over time, in a continuous, near-continuous, or periodic manner. As one example, the computing device 110 will display the contents of a data file 123 while the user 180 maintains his index finger on a fingerprint sensor to verify his identify. If he moves his finger off the fingerprint sensor, the computing device 110 will remove the contents of the data file 123 from the display of the computing device 110.

In some cases, in addition to continuous verification of the identity of the user 180, the data file 123 can be opened by the computing device 110 only if certain additional access compliance rules 124 are met for the user 180, the computing device 110, the network 160, other device or network operating factors, or some combination thereof. For example, the access compliance rules 124 can include various compliance rules associated with individual users, groups of users, devices, groups of devices, communications networks, and other factors. The content access control engine 140 can permit or deny access to one or more data files 123 depending upon who is seeking to access the data files, what devices are used to seek access to the data files, and over what networks the devices are seeking to access data files, among other access compliance rules 124. As other examples, the access compliance rules 124 can include rules associated with the operating parameters or operating conditions of the computing device 110, among others. The content access control engine 140 can permit or deny access to one or more data files 123 depending upon the operating status of the computing device 110. In that sense, the computing device 110 incorporates additional aspects of compliance-only access to the data files 123 in the content 122.

The access compliance rules 124 include certain profile, credential, compliance, and other parameters or rules associated with access to the content 122. The access compliance rules 124 can define requirements for users of the computing device 110, requirements of computing device 110, requirements of the network 160, and other device or network operational requirements of factors. For example, the access compliance rules 124 can define whether or not a certain class or category of users, certain computing devices, or certain networks can be used to access one or more of the data files 123. The content access control engine 140 and the authentication module 150 can refer to the access compliance rules 124 to determine when and how to perform content access control and authentication procedures.

The access compliance rules 124 can also define the enforcement of certain remedial actions in the event that that the content access control engine 140 or the authentication module 150 blocks access to any of the data files 123. The access compliance rules 124 can also define the enforcement of certain remedial actions in the event that that the user 180 (or other users) of the computing device 110 fails the authorization process performed by the authentication module 150. Remedial actions can be taken under various circumstances based on the access compliance rules 124, such as when an operating system of the computing device 110 is jailbroken (e.g., rooted, modified, etc.), when an unauthorized application (e.g., blacklisted, malware, etc.) is detected on the computing device 110, when one or more mobile device management profiles or agents have been removed from the computing device 110, when an application or service profile is removed from the computing device 110, when user identity verification or credentials fail to meet compliance rules, or when the computing device 110 is not compliant with certain geographical or location-based requirements, among other situations.

The device subsystems 126 can include various types of hardware, software, or hardware and software subsystems of the computing device 110, such as but not limited to input subsystems, output subsystems, display subsystems, data communications subsystems, positioning or orientation subsystems, image capture subsystems, etc. The input subsystems can include keyboards, keypads, touch pads, touch screens, microphones, cameras, buttons, switches, sensors, global navigation satellite system (GNSS), etc. The output and display subsystems can include speakers, ringers, buzzers, haptic feedback systems, display screens, indicator lights, etc. The data communications subsystems can include cellular, IEEE 802.11-based Wi-Fi, Bluetooth®, or any other suitable data communications system or variant thereof. The positioning or orientation subsystems can include motion sensors, orientation sensors, accelerometers, gyroscopes, etc. The image capture subsystem can include several image sensors, flashes, optical assemblies, etc., on various sides (e.g., front, back, etc.) of the computing device 110.

As noted above, the applications 130 are executable on the computing device 110 and can be used to open, display, and edit the data files 123. Among other types of applications, the applications 130 can include Internet browsers, e-mail applications, spreadsheet or word processing applications, image processing applications, video and audio players and editor applications, etc. Using one or more of the applications 130, the user 180 of the computing device 110 can open, view, and edit the data files 123 among the content 122. Similarly, the user 180 can open, view, and edit data files stored in the managed content 174 using the applications 130, once those data files are transmitted to the computing device 110 over the network 160.

The content access control engine 140 coordinates the operations of continuous authentication in the computing device 110 and includes an access controller 142 and an authentication monitor 144. The access controller 142 is configured to receive or intercept requests from the user 180 to open or access one or more of the data files 123. Requests to open the data files 123 can be received by the computing device 110 through a keyboard, pointer device, touchscreen, or other input subsystem of the computing device 110. As noted above, the metadata 123A can specify whether any given data file 123 is associated with sensitive data or access permission requirements or rules. Additionally or alternatively, the profile data 124 can define whether or not any given data file 123 contains sensitive data for which continuous authentication is required.

If the data files 123 requested by the user 180 include sensitive data or are otherwise designated as being protected by certain access permission requirements, then the access controller 142 can prompt the user 180 to perform an authentication procedure using the authentication module 150. The authentication monitor 144 is then configured to determine whether the authentication module 150 produces a verification or rejection result for the user 180 using the authentication procedure. If the authentication module 150 produces or generates a verification using the authentication procedure, then the content access control engine 140 opens (e.g., displays, etc.) the data files 123 for viewing and editing. If the authentication module 150 produces a rejection using the authentication procedure, the content access control engine 140 can generate a display message to inform the user 180 that he is not authorized to open the data files 123.

The authentication module 150 is configured to confirm the identity of the user 180 (and other users) based on at least one biometric authentication procedure, such as a fingerprint authentication procedure, a facial recognition authentication procedure, a retinal scan procedure, or a pulse-response authentication procedure, among other procedures. To confirm the identity of the user 180 and distinguish the user 180 from other individuals, the authentication module 150 can register the user 180 for use with the computing device 110. In that context, the user 180 can configure the authentication module 150 with one or more usernames, passwords, pin numbers, biometric response profiles, or other unique identifying information during a verification or enrollment process. The biometric response profiles can include fingerprint profiles, facial recognition profiles, retinal scan profiles, pulse-response profiles, etc. The biometric response profiles include unique identifying information that can be stored as the authentication keys 152 for reference and processing by the authentication module 150 during authentication procedures.

The analysis engine 154 is configured to direct the operation of the capture module 156 to perform biometric capture procedures, such as a fingerprint, facial recognition, or retinal scans on the user 180. The analysis engine 154 is then configured to analyze one or more biometric responses captured by the capture module 156 to determine whether they match identifying profile information stored in the authentication keys 152. When a biometric response captured by the capture module 156 matches identifying profile information stored in the authentication keys 152, the authentication module 150 returns a verification result for the user 180 (and other users) to the content access control engine 140. On the other hand, when a biometric response captured by the capture module 156 does not match the identifying profile information stored in the authentication keys 152 for the user 180, the authentication module 150 returns a rejection result to the content access control engine 140.

In some cases, the authentication module 150 can load the biometric response profiles of users other than (or in addition to) the user 180. For example, one or more of the data files 123 might include metadata 123A that defines biometric response profiles of users other than the user 180. When a request to open a data file 123 having metadata 123A that defines biometric response profiles is identified, the biometric response profiles can be loaded as the authentication keys 152 in the memory of the authentication module 150. Thus, in some cases, the computing device 110 can authenticate the identity of various users and permit continuous authentication for many different users.

The capture module 156 can be embodied as one or more biometric sensors, such as fingerprint sensors, retinal scanners, image sensors, pulse-response sensors, other biometric-related sensors, and combinations thereof. Thus, at the direction of the analysis engine 154 (and based on a prompt for the user 180 to perform an authentication procedure), the capture module 156 can determine one or more biometric responses 182 of the user 180 (or other users) for comparison with data stored in the authentication keys 152 during an authentication procedure.

The analysis engine 154 compares the biometric responses 182 captured by the capture module 156 with the data stored in the authentication keys 152 to during an authentication procedure. If the analysis engine 154 produces or generates a verification using the authentication procedure, then the content access control engine 140 can open the data files 123 for viewing and editing. If the analysis engine 154 produces a rejection using the authentication procedure, the content access control engine 140 can generate a display message to inform the user 180 that he is not authorized to open the data files 123.

Figure 2A:
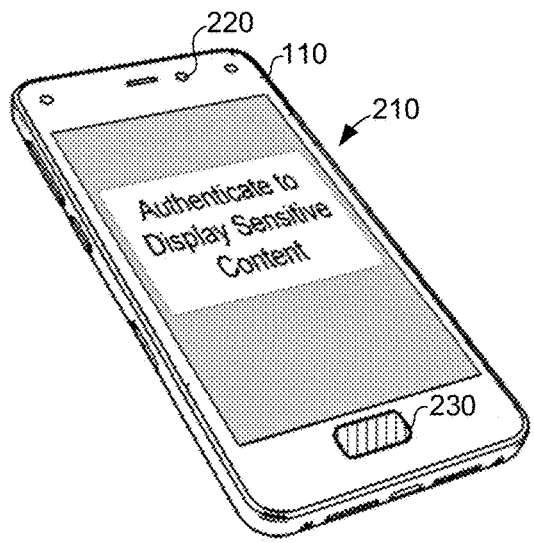
FIGS. 2A-D illustrate example display screens of a computing device during various phases of continuous content authentication according to various examples described herein.

FIGS. 2A-D illustrate example display screens of the computing device 110 during various phases of continuous content authentication according to various examples described herein. FIG. 2A illustrates a representative example of the computing device 110. The computing device 110 is illustrated as a cellular telephone in FIG. 2A although the computing device 110 is not limited to any particular type of device. The computing device 110 can be embodied as other types of devices, such as desktop computers, laptop computers, tablet computing devices, personal digital assistants, wearable computing devices, handheld gaming devices, music or media players, etc. Among other elements, the computing device 110 includes a display 210, a fingerprint sensor 230, and a camera 220.

FIG. 2A is representative of the state of the computing device 110 after the user 180 attempts to open one or more of the data files 123. Particularly, if the data files 123 include sensitive data or are otherwise designated as being protected by certain access permission requirements, then the access controller 142 can present the prompt shown on the display 210 in FIG. 2A. The prompt directs the user 180 to perform an authentication procedure using the fingerprint sensor 230, which is an example of the capture module 156, among other biometric sensors.

Figure 2B:
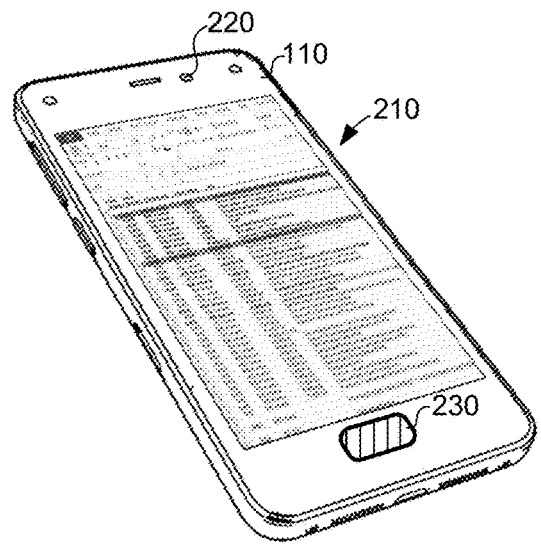

FIG. 2B is representative of the state of the computing device 110 after the user 180 has authenticated himself using the fingerprint sensor 230. For example, after the user 180 places a fingertip on the fingerprint sensor 230, the analysis engine 154 can determine a biometric response 182 of the user 180 and compare it with data stored in the authentication keys 152 to generate a verification or rejection result for the user 180. If the authentication module 150 generates an identity verification result for the user 180, the access controller 142 can present the display 210 of the contents of the data file 123 as shown in FIG. 2B. Alternatively, if the authentication module 150 generates a rejection result for the user 180, the access controller 142 can display a message indicating that the user 180 is not permitted to access the data file 123.

Figure 2C:
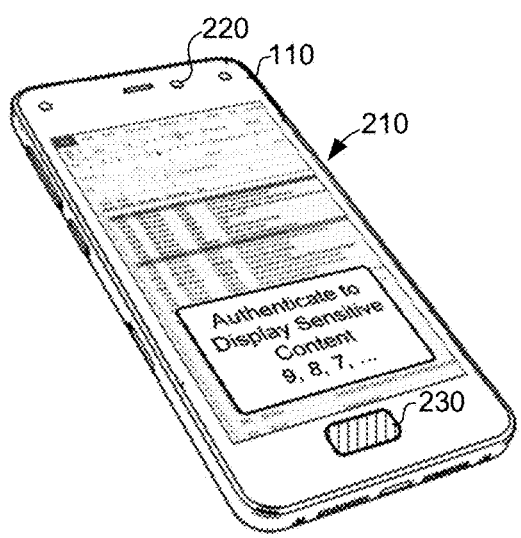

According to the concepts of continuous authentication described herein, the computing device 110 is configured to continuously or periodically confirm that the user 180 is using the computing device 110. To that end, the content access control engine 140 can continue to poll the authentication module 150 to ensure that the user 180 continues to place or hold his finger on the fingerprint sensor 230 while the contents of the data file 123 are present on the display 210. For example, even after being verified, if the user 180 removes his finger from the fingerprint sensor 230, the content access control engine 140 can remove the content of the data file 123 from the display 210. The content can be removed in any number of ways. In one example, after the user 180 removes his finger from the finger print sensor 230, the content access control engine 140 can present a countdown timer. The countdown timer can inform the user 180 that continued authentication is required within a certain period of time to maintain the display of the contents of the data file 123, as shown in the example of FIG. 2C.

Figure 2D:
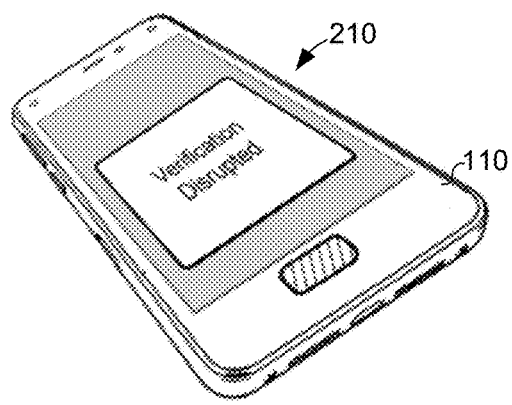

The content access control engine 140 can rely upon a combination of authentication procedures to protect confidential information. For example, to verify the identity of the user 180, the content access control engine 140 can require both continuous fingerprint and facial recognition authentication of the user 180 using the camera 220. In another case, the content access control engine 140 can require both continuous fingerprint authentication and that the computing device 110 be maintained at a certain orientation. As shown in FIG. 2D, for example, the content access control engine 140 can present a display that verification has been disrupted if the user 180 attempts to tilt the computing device 110 away to show the display 210 to others. In another case, if the computing device 110 is not maintained at the appropriate orientation, the content access control engine 140 can present a countdown timer before presenting the display that verification has been disrupted. The countdown timer can inform the user 180 that the orientation of the computing device 110 must be corrected within a certain period of time to maintain the display of the contents of the data file 123.

Figure 3:
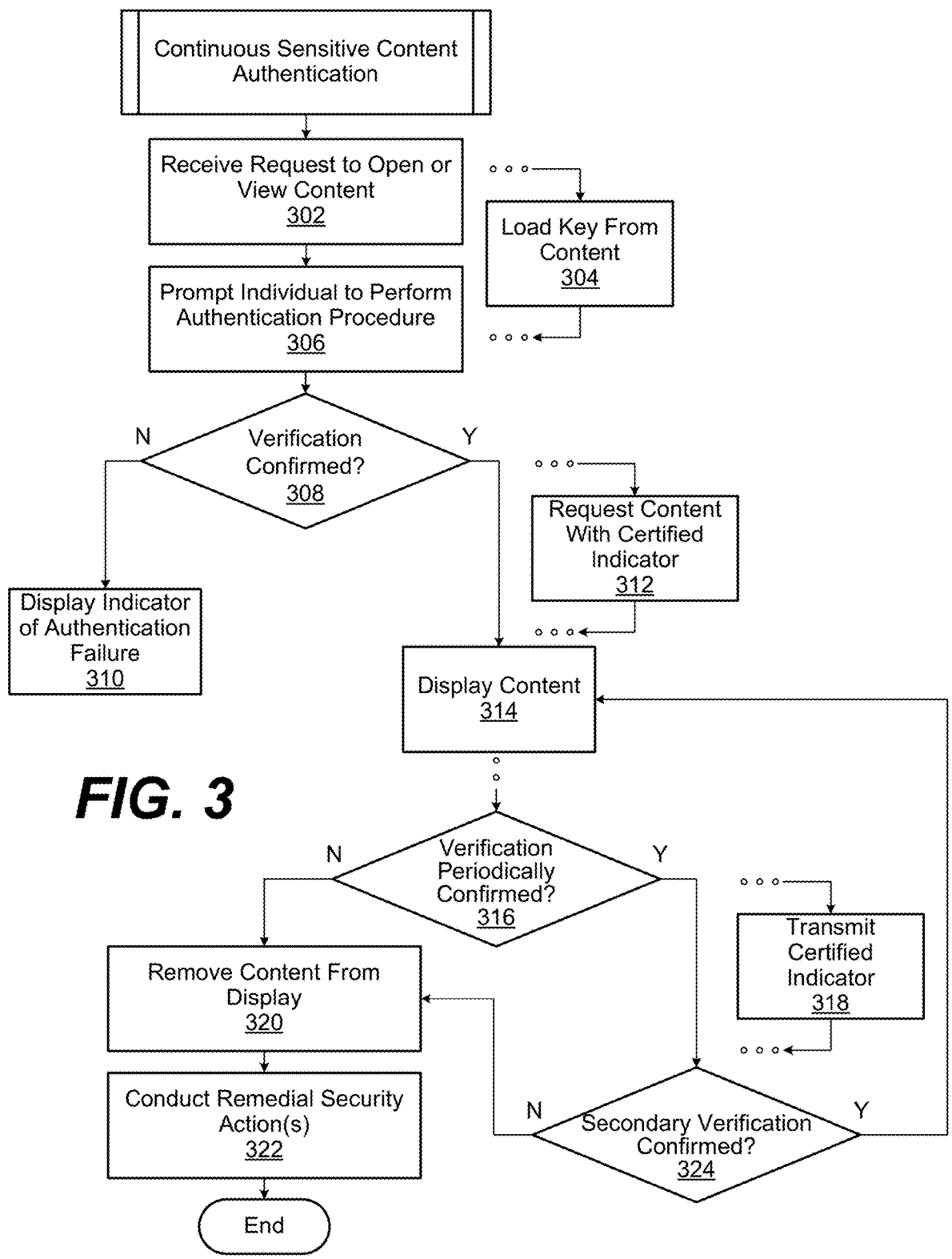
FIG. 3 illustrates a process for continuous content authentication according to various examples described herein.

FIG. 3 illustrates a process for continuous sensitive content authentication according to various examples described herein. The process illustrated in FIG. 3 is described in connection with the computing device 110 shown in FIG. 1, although other computing devices could perform the process. Although the flowcharts show a specific order of execution, the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

At step 302, the process can include the content access control engine 140 receiving a request to open or view content, such as one or more of the data files 123. In some cases, the requested data files can be hosted on the computing environment 170 and stored in the managed content 174. Requests to open the data files 123 (or data files stored on the computing environment 170) can be received by the computing device 110 through a keyboard, pointer device, touchscreen, or other input subsystem of the computing device 110. The profile data 124 can define whether or not a certain class or category of users, such as the user 180, is permitted to access the data files 123 or others.

If the requested data files 123 include metadata 123A with an authentication key for certain users, that authentication key data can be loaded into the authentication module at step 304. If the requested data files are stored or hosted by the computing environment 170, any authentication keys associated with those files can be transmitted, potentially in a secured or encrypted form, over the network 160 to the computing device 110 for loading. By loading authentication keys into the authentication module 150, the computing device 110 can facilitate authenticated examination of data files by any user of the computing device 110, including users that have not performed an enrollment process with the authentication module 150.

If the data files 123 requested at step 302 contain sensitive content, at step 306, the process can include the content access control engine 140 prompting an individual to perform an authentication procedure based on the request. The prompt can be displayed on a display screen of the computing device 110, for example, such as the display shown in FIG. 2A.

At step 308, the process can include the content access control engine 140 determining whether the authentication module 150 has produced a verification or a rejection using the authentication procedure. As described herein, the authentication procedure can involve one or more biometric procedures, such as one or more fingerprint authentication procedures, facial recognition authentication procedures, retinal scan procedures, pulse-response authentication procedures, or combinations thereof. As one example, to verify the identity of the user 180, the content access control engine 140 and the authentication module 150 can require both continuous fingerprint and facial recognition authentication of the user 180, although other combinations of procedures are within the scope of the embodiments. In another case, the content access control engine 140 can require both continuous fingerprint authentication and that computing device 110 be maintained at a certain orientation.

Authentication can be verified or rejected by the authentication module 150 based on a comparison of one or more biometric responses 182 of the user 180 (or other users) with data stored in the authentication keys 152. If authentication is rejected (e.g., the identity of the user 180 cannot be verified), then the process can proceed to step 310 where an indication of the authentication failure can be presented on the display 210 of the computing device 110. Otherwise, if authentication is verified, then the process can proceed to one or both of steps 312 and 314, depending on which embodiment of the process is to be implemented.

The process can proceed to step 312 if the data files requested at step 302 are hosted on the computing environment 170. In that case, at step 312, the process can include the content access control engine 140 transmitting a request to the computing environment 170 for the data files requested at step 302. Along with that request, content access control engine 140 can also transmit a certified indicator of the verification result confirmed by the authentication module 150 at step 308. The certified indicator can take various forms. In one example case, the certified indicator can include an encrypted copy of the verification result from the authentication module 150 along with a digital signature of the computing device 110. In that way, the computing environment 170 can confirm both the verification result from the authentication module 150 and also the identity of the computing device 110. Using the certified indicator, device management service 176 of the computing environment 170 can confirm both which device it is communicating with and also that the user of that device is authenticated to view the requested content. Based on those confirmations, the computing environment 170 can transmit the requested data files to the computing device 110 over the network 160 in response to the request received at step 312.

After verification is confirmed, at step 314, the process can include displaying the content of the data files requested at step 302. The display of the content can be controlled by the content access control engine 140 through one or more of the applications 130. The content can be displayed on the display 210 of the computing device 110, for example, as shown in the example in FIG. 2B.

After the content is displayed, the computing device 110 can proceed to confirm continuous authentication of the user 180 (or another user). For example, at step 316, the process can include the content access control engine 140 periodically confirming the verification of the user 180. The confirmation can be achieved by the content access control engine 140 polling the authentication procedure(s) performed by the authentication module 150 over time. The polling can occur over time, in a continuous, near-continuous, or periodic manner. If verification is confirmed, the process can include transmitting a certified indicator of the verification to the computing environment 170 at step 318. In that way, the computing environment 170 can be informed that the user 180 of the computing device is being continuously authenticated at the computing device 110.

If, at any time, the verification can not be confirmed at step 316, the process can proceed to step 320. At step 320, the process can include the content access control engine 140 removing the content of the data files from display. The content might be removed after a countdown as shown in FIG. 2C, for example, or immediately upon the failure of verification of the user 180. Depending upon the extent of the sensitive content in the data files, removing the content can amount to removing only a portion of the content being displayed, such as a sensitive paragraph, photograph, or other content portion.

At step 322, the process can also include the content access control engine 140 performing one or more remedial security actions, such as deleting the data files requested at step 302. In the case that the data files are stored on the computing environment 170, the device management service 176 can instruct the computing device 110 to delete the data files requested at step 302 upon the failure to receive a certified indicator of the verification of the user 180 (e.g., the indicator transmitted at step 316) within a certain period of time. In that way, the computing environment 170 can manage data files and content transmitted to the computing device 110, including the deletion of data files upon the failure of continuous authentication. Step 322 can be omitted in some cases, however, such as if there is no need to delete the data files requested at step 302 after continuous authentication ends. Regardless of whether the data files are deleted at step 322, the process can end after steps 320 and/or 322.

When continued verification is confirmed at step 316, the process can proceed to step 324. At step 324, the process can include the content access control engine 140 performing a secondary verification. The secondary verification can be related to whether or not the computing device 110 is maintained at a certain orientation and not being tilted to show content to others. Additionally or alternatively, the secondary verification can include another biometric verification performed by the authentication module 150. In other cases, the secondary verification at step 322 can be omitted. If the secondary verification is confirmed at step 324, then the process can proceed back to step 314 for continued display of content. Otherwise, if the secondary verification is not confirmed at step 324, the process can proceed to step 318 to remove at least a portion of the content from display at step 320 as shown in FIG. 3.

The flowchart in FIG. 3 shows an examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing device 110 and the computing environment 170 can each include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the applications 130, content access control engine 140, and authentication module 150, and/or other components can be stored in one or more storage devices and be executable by one or more processors in the computing device 110. Also, a data store, such as the data store 120 can be stored in the one or more storage devices.

The applications 130, content access control engine 140, authentication module 150, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the applications 130, content access control engine 140, and authentication module 150 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device, the program code being configured to cause the at least one computing device to at least:

receive a request to open content;

prompt an individual to perform an authentication procedure based on the request;

display the content on a display device of the at least one computing device in response to a verification using the authentication procedure;

periodically confirm the verification using the authentication procedure while the content is displayed on the display device;

in response to a rejection using the authentication procedure, indicate, on the display device, a period of time within which to confirm the verification to maintain the display of the content on the display device; and remove the display of the content from the display device in response to the rejection using the authentication procedure continuing after the period of time.

2. The non-transitory computer-readable medium according to claim 1, wherein the program code is further configured to cause the at least one computing device to remove the display of a portion of the content from the display device in response to the rejection continuing after the period of time.

3. The non-transitory computer-readable medium according to claim 1, wherein the program code is further configured to cause the at least one computing device to delete the content from the at least one computing device in response to the rejection continuing after the period of time.

4. The non-transitory computer-readable medium according to claim 1, wherein the authentication procedure comprises at least one biometric authentication procedure.

5. The non-transitory computer-readable medium according to claim 1, wherein the program code is further configured to cause the at least one computing device to confirm a secondary verification using a secondary authentication procedure during the display of the content on the display device.

6. The non-transitory computer-readable medium according to claim 1, wherein the program code is further configured to cause the at least one computing device to:

transmit a content request for the content, the content request including a certified indicator of the verification;

receive the content based on the certified indicator of the verification; and periodically transmit the certified indicator of the verification.

7. The non-transitory computer-readable medium according to claim 6, wherein the program code is further configured to cause the at least one computing device to delete the content from the at least one computing device in response to receipt of a content management delete command after a failure to periodically transmit the certified indicator of the verification.

8. The non-transitory computer-readable medium according to claim 1, wherein the program code is further configured to cause the at least one computing device to load an authentication key from the content into an authentication module to perform the authentication procedure.

9. A method, comprising:
receiving, by at least one computing device, a request to open content;
prompting, by the at least one computing device, an individual to perform an authentication procedure based on the request;
determining, by the at least one computing device, one of a verification using the authentication procedure;
displaying, by the at least one computing device, the content on a display device of the at least one computing device in response to the verification;
confirming, by the at least one computing device, the verification or a rejection using the authentication procedure during the display of the content on the display device; and
in response to the rejection using the authentication procedure, indicating, on the display device, a period of time within which to confirm the verification to maintain the display of the content on the display device.

10. The method according to claim 9, further comprising removing, by the at least one computing device, at least a portion of the display of the content from the display device in response to the rejection continuing after the period of time.

11. The method according to claim 10, further comprising deleting, by the at least one computing device, the content from the at least one computing device in response to the rejection continuing after the period of time.

12. The method according to claim 9, further comprising:
confirming, by the at least one computing device, a secondary verification using a secondary authentication procedure of the at least one computing device during the display of the content on the display device; and
removing, by the at least one computing device, at least a portion of the display of the content from the display device in response to a rejection using the secondary authentication procedure.

13. The method according to claim 12, wherein:
the authentication procedure comprises one of a fingerprint authentication procedure, a facial recognition authentication procedure, or retinal scan procedure; and
the secondary authentication procedure comprises another one of the fingerprint authentication procedure, the facial recognition authentication procedure, or the retinal scan procedure.

14. The method according to claim 9, further comprising:
transmitting, by the at least one computing device, a content request for the content, the content request including a certified indicator of the verification; and
periodically transmitting, by the at least one computing device, the certified indicator of the verification.

15. The method according to claim 14, further comprising deleting, by the at least one computing device, the content from the at least one computing device in response to receipt of a content management delete command after a failure to periodically transmit the certified indicator of the verification.

16. The method according to claim 9, further comprising loading, by the at least one computing device, an authentication key from the content into an authentication module to perform the authentication procedure.

17. A method, comprising:
prompting, by the at least one computing device, an individual to perform an authentication procedure based on a request to open content;
determining, by the at least one computing device, a verification using the authentication procedure;
transmitting, by the at least one computing device, a content request for the content, the content request including a certified indicator of the verification;
receiving, by the at least one computing device, the content according to the content request and based on the certified indicator of the verification;
displaying, by the at least one computing device, the content on a display device of the at least one computing device in response to the verification using the authentication procedure;
confirming, by the at least one computing device, the verification or a rejection using the authentication procedure during the display of the content on the display device; and
in response to the rejection using the authentication procedure, indicating, on the display device, a period of time within which to confirm the verification to maintain the display of the content on the display device.

18. The method according to claim 17, further comprising periodically transmitting, by the at least one computing device, the certified indicator of the verification.

19. The method according to claim 17, further comprising removing, by the at least one computing device, at least a portion of the display of the content from the display device in response to the rejection continuing after the period of time.

20. The method according to claim 19, further comprising deleting, by the at least one computing device, the content from the at least one computing device in response to receipt of a content management delete command after a failure to periodically transmit the certified indicator of the verification.

* * * * *